Patented June 6, 1939

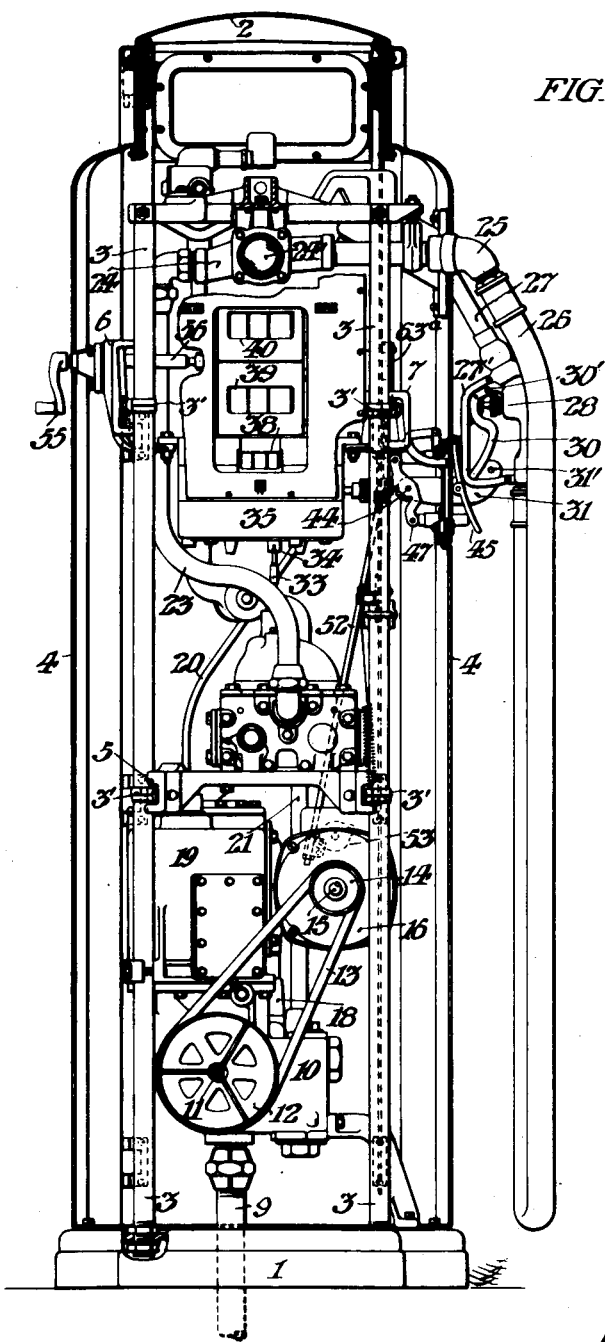
FIG. I.

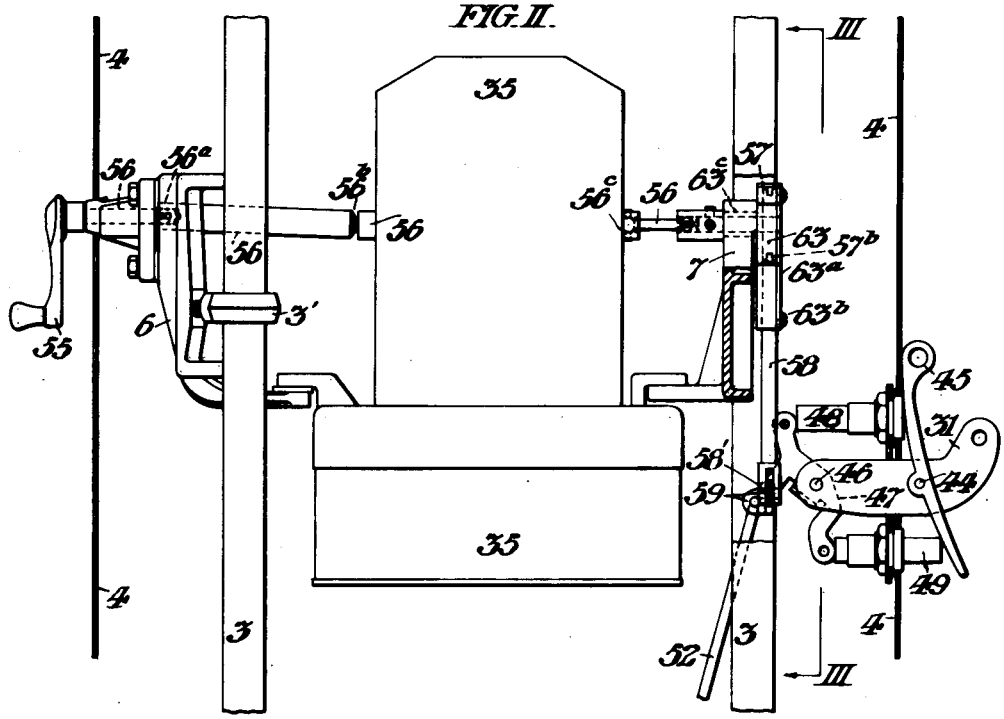
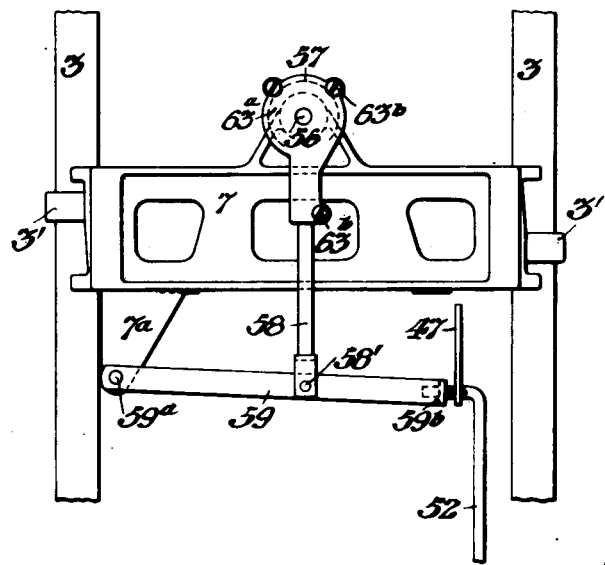

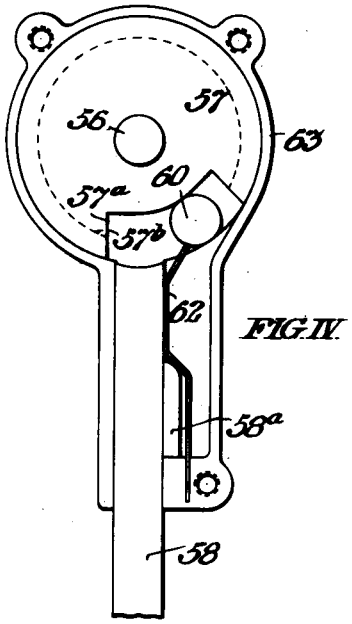
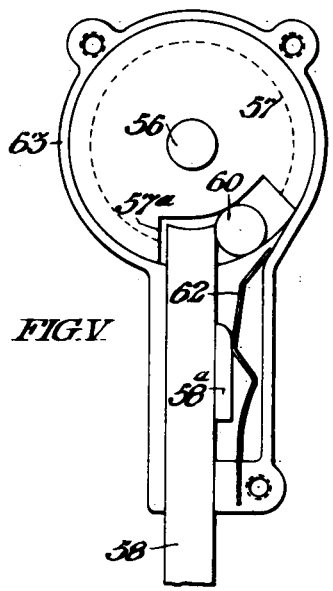
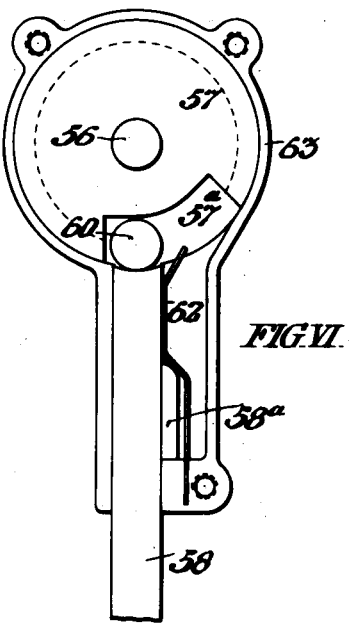
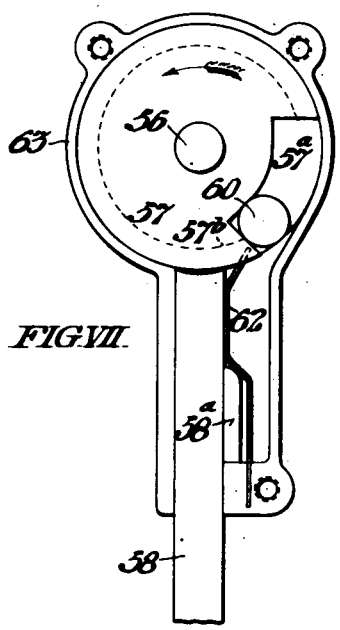

2,161,756

UNITED STATES PATENT OFFICE 2,161,756

LIQUID DISPENSING APPARATUS

Eric H. Bradley, Spring Lake, Mich., assignor to John Wood Manufacturing Company, Inc., Conshohocken, Pa., a corporation of Delaware Application October 26, 1938, Serial No. 236,989

7 Claims. (Cl. 221—95)

My invention is particularly applicable to metering pumps for dispensing gasolene, including a hose through which the liquid is dispensed by means of a pump driven by an electric motor; a meter being included between the pump and hose and connected with means for indicating the volume of liquid dispensed through the meter; such indicating means comprising a circular series of numerals including zero. Such apparatus is ordinarily provided with an electric switch which may be manipulated by the dispensing operator to start and stop said motor, and also manually operative means for resetting the indicator to zero position. However, unless means are provided to insure the return of the indicator to zero position between successive dispensing operations of such apparatus; an operator may accidentally or intentionally fail to reset the indicator to zero position and thus cheat the next customer to the extent that the indicator is left advanced with respect to its zero position.

In the form of my invention chosen for illustration herein, said electric switch is arranged to be operated by a bell crank lever fulcrumed within a side wall of a casing inclosing the apparatus elements aforesaid so as to oscillate in a vertical plane and having one arm extending inwardly, pivotally connected with the upper end of an upright rod extending downward to said switch; said lever having other arms projecting respectively above and below its fulcrum in cooperative relation with push plungers by which said lever may be tilted. When said upper push plunger is pushed in, horizontally, said rod is pushed down to open said switch and stop the dispensing operation. When said lower plunger is pushed in, horizontally, said lever is tilted to raise said rod and close said switch. The construction and arrangement are such that said switch may be opened at any time by manipulation of said upper plunger. My invention provides interlock mechanism to prevent the manipulation of said lower plunger to close said switch except when said indicator has been reset to its zero position.

As hereinafter described, the interlock mechanism for locking the switch in closed position until the reset mechanism is operated to set the indicator at zero position includes a cam rigidly connected with a horizontally disposed shaft which may be turned by the operator to reset the indicator to zero position, and a locking ball or other element susceptible of rolling motion which is placed in locking position and displaced from locking position by said cam, as hereinafter described.

In said drawings; Fig. I is a front elevation of a metering pump of what is known as the curb-stand type for dispensing gasolene and including a convenient embodiment of my invention; the front wall of the inclosing casing being removed to disclose the apparatus contained in said casing.

Fig. II is a fragmentary vertical sectional view of said casing on a larger scale showing the means connecting the motor switch with the indicator resetting mechanism.

Fig. III is a fragmentary vertical sectional view taken on the line III, III in Fig. II in the direction of the arrows on said line and showing the means connecting the switch rod, locking bar, and said cam on the resetting shaft.

Figs. IV to VII inclusive show fragmentary views of the locking bar, ball, and spring, and said cam, in different positions; the casing cover for those parts shown in Fig. III being omitted.

Fig. IV shows the position of the interlock mechanism when the indicator is at zero position with the motor switch open.

Fig. V shows the position of said parts with the motor switch closed and consequent release of the locking ball by the locking spring.

Fig. VI shows the position of the parts when the motor switch is open and the indicator has not been reset to zero position; the locking ball having gravitated to registry with the locking bar so as to prevent its upward movement.

Fig. VII shows the position of the parts at the completion of more than a revolution of the resetting shaft and cam with the effect of displacing the locking ball into engagement with the locking spring to detain it out of registry with the locking bar.

In Fig. I, I have shown an embodiment of my invention in a housing such as disclosed in my application Serial No. 195,292 filed March 11, 1938, for Letters Patent of the United States.

Referring to Fig. I; the liquid dispensing apparatus is mounted in the housing which is adapted to be fixed upon a pavement or platform at a curb or driveway and includes the cast metal base member 1 and top member 2 which are substantially rectangular and connected at their corners by four cylindrical standards 3, which serve to support a thin sheet metal casing 4 which includes four panels extending vertically upon the four sides of the housing. Said frame standards 3 are also cross-connected by transverse frame members 5, 6, and 7, rigidly connected therewith by U-bolts 3'.

The liquid to be dispensed is conveniently stored in an underground tank from which it is elevated through the pipe 9 by the operation of the pump 10. Said pump includes a rotor having the shaft 11 with the grooved pulley 12 connected by the belt 13 with the grooved pulley 14 on the shaft 15 of the electric motor 16, which is supported by said transverse frame member 5. The liquid is discharged from said pump 10 through the conduit 18 into the receptacle 19 in which air and vapor entrained in the liquid are eliminated from the liquid and discharged through the outlet conduit 20 which extends to the top of the frame, from which the eliminated fluid is discharged. The liquid passes from said casing 19 through the conduit 21 to the meter 22 from which it is discharged through the conduits 23 and 24. The conduit 24 is provided with what is known as a "see-gage" 24' which includes transparent end caps respectively at opposite sides of the casing 4 rendering visible the passage of liquid through said conduit 24. Said conduit 24 is connected by the metal coupling 25 with the flexible dispensing hose 26. The other, free, end of said hose is provided with the metal nozzle 27 containing the valve 28 which is normally closed by a spring in the nozzle but may be manually opened by the valve lever 30 fulcrumed at 30' in the nozzle handle frame 27'. The lower end of said nozzle frame 27' is slotted to receive the upturned end of the stationary supporting hook 31, which then, in the position shown in Fig. I, prevents valve opening movement of said valve lever 30. Said hook 31 has the hole 31' extending through it to be engaged by a padlock, not shown, to hold the nozzle in the idle position shown in Fig. I, when desired. In that position the end of said nozzle 27 extends within the casing 4.

Said meter 22 is rigidly connected with the intermediate cross frame 5. The casing of said meter 22 incloses a rotor which is turned by the passage of liquid through said casing and has the driving shaft 33 which is operatively connected with the shaft 34 of the computing registering mechanism inclosed in the casing 35. Said registering mechanism includes two oppositely counterpart sets of indicating means displayed through respective windows in said casing 4 and through which said see-gage 24' is visible.

One set of said indicating means is shown in Fig. 1 where it displays at the opening 38 the price per gallon of the liquid dispensed; the price displayed being 20$\frac{1}{10}$ cents. The opening 39 displays the number of gallons dispensed at a single operation, but, as Fig. I shows the idle condition of the apparatus preceding a dispensing operation, the opening 39 only displays three zeros. The opening 40 displays the computed value of the volume of liquid sold at a single dispensing operation, in dollars and cents, but, in the idle position of the apparatus shown, said opening displays three zeros. That is what is referred to herein as the zero position of the indicating means.

Referring to Figs. I and II; said hose supporting hook 31, which is rigidly connected with said stationary casing 4 supports the fulcrum 44 of the push switch lever 45, and the fulcrum 46 of the switch actuating lever 47. The upper arm of said lever 47 is connected to the push plunger 48 and the lower arm of said lever 47 is pivotally connected to the push plunger 49; both of which plungers are mounted to reciprocate horizontally through said casing 4. Said lever 47 has the arm 50 pivotally connected to the upper end of the switch rod 52, the lower end of which is pivotally connected with the electric switch 53. In the position shown in Figs. I and II; with the upper end of the push switch lever 45 thrust inward against the outer face of the casing 4; said rod 52 is thrust to the limit of its downward movement to open said switch 53 and thus prevent operation of the electric motor 16 and pump 10. However, when said hose nozzle 27 is removed from said hook 31; said switch push lever 45 may be manually pushed inward at its lower end to reverse the position of said switch actuating lever 47, thus pulling the switch rod 52 to the upper limit of its movement and closing said switch 53 to energize said electric motor 16 and operate said pump 10, to effect a dispensing operation.

The crank handle 55, shown projecting from the left hand side of said casing 4 in Fig. I is on a shaft 56 of said indicating mechanism which is inclosed in the casing 35, shown in Fig. II, and said crank may be turned by the operator to reset said indicating mechanism to zero position.

As shown in Figs. II to VII inclusive; the opposite end of said shaft 56 has fixed thereon the cam 57. Said cam 57 registers with a vertically reciprocatory locking bar 58, operatively connected with said switch rod 52 so as to be movable up and down therewith, by the bell crank lever 47. As shown in Fig. III; the lower end of said bar 58 is connected, by the pivot 58', with the locking lever 59 which is fulcrumed at 59ᵃ on the bracket 7ᵃ of the cross frame member 7. The other end of said lever 59 is bent at right angles to form a perforated bearing 59ᵇ, pivotally engaging the upper end of said switch rod 52 which extends horizontally through said bell crank lever 47.

Said cam 57 has an arcuate sectoral notch 57ᵃ in its perimeter extending about one-quarter of its circumference in which a steel locking ball 60, or other equivalent roller locking element, is carried so as to be presented in registry with the top of said locking bar 58 to prevent upward movement of that bar and consequent closure of said switch 53, after the latter has been opened by manipulation of said lever 47, and until said cam is turned by the resetting shaft 56 more than a complete revolution. During that turning movement said indicator mechanism is brought to the zero position shown in Fig. I, and said locking ball 60 is carried by said cam 57 out of registry with said locking bar and into engagement with the locking spring 62 which is fixed at its lower end in the lock casing 63 which incloses said cam 57 and ball 60. Said spring 62 temporarily holds said ball 60 out of registry with said locking bar 58. Thereupon, said switch may be closed by pushing in said lower switch plunger 49, by the push switch lever 45, to tilt said bell crank lever 47 and incidentally lift said locking bar 58 into the notch 57ᵃ in said cam. Said locking bar 58 has rigidly fixed upon one side thereof the cam projection 58ᵃ which, when said switch 53 is thus closed, encounters said locking spring 62 and pushes it aside to release said ball 60, which thereupon rolls downward, in said notch 57ᵃ and into contact with the side of said casing 63, and into contact with the side of said locking bar 58 so that it may instantly gravitate onto the upper end of said bar 58 when next said switch 53 is opened and said bar 58 consequently lowered. Said ball 60 then and thus prevents closure of said switch 53 until said locking ball 60 is again thrust aside by the turning movement of said cam 57 and into the position in which it is detained by said spring 62, as above described.

As shown in Figs. II and III, said lock casing 63 has the lid 63ᵃ detachably connected therewith by the three screws 63ᵇ to confine said locking ball 60 in said notch 57ᵃ in the cam 57, and afford a slide bearing for vertical reciprocation of said locking bar 58. As indicated in Figs. II and III, said locking casing 63 is rigidly connected with the cross frame member 7 by the tubular bearing 63ᶜ for the shaft 56, which tubular bearing is in unitary relation with said lock casing 63 and fixed in said cross frame member 7.

Fig. IV shows the normal position of the locking mechanism wherein the locking bar 58 is withdrawn from the notch 57ᵃ in the cam 57 but the locking ball 60 is detained by the locking spring 62, out of alinement with said locking bar so that the switch 53 may be closed as above described with consequent movement of said locking bar upward into said notch. However, as shown in Fig. V, such upward movement of the locking bar 58, consequent upon the closure of the switch 53 causes the cam projection 58ᵃ to thrust said spring 62 aside and release said ball 60 to gravitate against the side of said locking bar 58, in readiness to roll, by gravitation, into alinement with said locking bar when the switch 53 is again opened with consequent downward movement of said locking bar 58 to the position shown in Fig. VI; in which position said locking ball 60 locks the locking bar 58 out of said notch 57ᵃ and thus prevents closure of said switch 53 and consequently prevents a succeeding dispensing operation until the indicator mechanism is zeroized. Fig. VII shows the zeroizing shaft 56 and cam 57 turned counter-clockwise more than a complete revolution to effect the zeroizing of the indicator mechanism and with the effect of displacing said locking ball 60 from its locking position and aside from alinement with the locking bar 58 and into engagement with the locking spring 62 which detains it when the zeroizing shaft 56 and cam 57 are returned, clockwise, to the normal position shown in Fig. IV.

As above explained; movement of said shaft 56 and cam 57 more than a complete revolution, say four hundred and five degrees, counter-clockwise from the position shown in Fig. IV to the position shown in Fig. VII is effected manually, by turning the crank handle 55. Clockwise movement of said shaft 56 and cam 57, forty-five degrees, from the resetting position shown in Fig. VII to the normal position shown in Fig. IV, is automatically effected when the operator releases said handle 55, and by a spring in the registering mechanism which is stressed for that purpose by said manual movement of the shaft 56 forty-five degrees beyond a complete revolution.

As indicated in Fig. II; I find it convenient to form said indicator mechanism resetting shaft 56 in five sections which are connected by four universal joints, respectively 56ᵃ, 56ᵇ, 56ᶜ, and 56ᵈ, to permit said shaft to be freely operated by said crank handle 55, regardless of inaccuracies in the assembling of said registering mechanism in the casing 4. As indicated in Figs. II and IV; I find it convenient to make cam 57 spool shaped, with the circumferential groove 57ᵇ in its perimeter, to receive the free end of spring 62 as shown in Fig. VII.

However, I do not desire to limit myself to the precise details of construction and arrangement herein set forth, as it is obvious that various modifications may be made therein without departing from the essential features of my invention as defined in the appended claims.

I claim:

1. In liquid dispensing apparatus, the combination with a pump operated by an electric motor; of a switch in said motor circuit; an indicator for manifesting the volume of liquid dispensed and movable with respect to a zero position; switch controlling means, including a manually operative lever for closing and opening said switch; locking means for preventing closure of said switch unless and until said indicator is reset to zero position after a dispensing operation, including a rotary shaft for manually resetting said indicator to zero position; a cam fixed on said shaft and having an arcuate sectoral notch in its perimeter; a locking bar operatively connected with said lever and mounted for longitudinal reciprocation into said cam notch when said switch is closed and out of said cam notch when said switch is opened; a ball mounted to roll in said notch, into alinement with said locking bar to prevent closing movement of said switch and bar; a lock casing for retaining said ball in said notch; a locking spring in said casing adapted to detain said ball out of alinement with said locking bar; a cam projection on said locking bar which when said switch is moved to closed position, encounters said locking spring and pushes it aside to release said ball to gravitate into alinement with said locking bar; whereby rotation of said shaft to zeroize said indicator causes said cam to thrust said locking ball aside from alinement with said locking bar and into engagement with said locking spring in which position said switch may be closed, with consequent movement of said locking bar into said notch and release of said spring to permit said locking ball to gravitate against the locking bar, and opening movement withdraws said locking bar from said notch and permits said ball to roll into alinement with said locking bar and prevent the return of the latter into said notch, until said ball is again displaced by an indicator zeroizing operation of said shaft and consequent displacement of said ball from such alinement by said cam.

2. In liquid dispensing apparatus, the combination with a pump operated by an electric motor; of a switch in said motor circuit; an indicator for manifesting the volume of liquid dispensed and movable with respect to a zero position; switch controlling means, including a manually operative lever for closing and opening said switch; locking means for preventing closure of said switch unless and until said indicator is reset to zero position after a dispensing operation, including a rotary shaft for manually resetting said indicator to zero position; a cam fixed on said shaft and having a notch in its perimeter; a locking bar operatively connected with said lever and mounted for movement into said cam notch when said switch is closed and out of said cam notch when said switch is opened; a ball mounted to roll in said notch, into the path of movement of said locking bar, to prevent closing movement of said switch and bar; means for retaining said ball in said notch; a spring adapted to detain said ball out of alinement with said locking bar; a cam projection on said locking bar which, when said switch is moved to closed position, moves said locking spring to release said ball to gravitate into said path; whereby rotation of said shaft to zeroize said indicator causes said cam to thrust said locking ball out of said path and into engagement with said locking spring in which position said switch may be closed, with consequent movement of said locking bar into said notch and release of said spring to permit said locking ball to gravitate in said notch, and opening movement withdraws said locking bar from said notch and permits said ball to roll into said path and prevent the return of the latter into said notch, until said ball is again displaced by an indicator zeroizing operation of said shaft and consequent movement of said cam.

3. The combination with a rotary shaft; of a cam fixed on said shaft and having a notch in its perimeter; a locking bar, alternately movable into and out of said cam notch; a ball mounted to roll in said notch, into the path of movement of said locking bar to lock said bar out of said notch; means for retaining said ball in said notch; a spring adapted to detain said ball out of alinement with said locking bar, when said shaft and cam are turned to displace said ball from such alinement and engage it with said spring; a cam projection on said locking bar which, when said bar is moved into said notch, moves said spring to release said ball to gravitate in said notch toward said bar; whereby, when said bar is moved out of said notch said ball gravitates into alinement therewith and prevents the return of said bar into said notch, until said ball is again displaced by turning movement of said shaft and cam.

4. The combination with a rotary shaft; of a cam on said shaft and having a notch in its perimeter; a locking bar, alternately movable into and out of said cam notch; a roller element mounted to roll in said notch, into the path of movement of said locking bar to lock said bar out of said notch; means for retaining said roller element in said notch; a spring adapted to detain said roller element out of alinement with said locking bar, when said shaft and cam are turned to displace said roller element from such alinement and engage it with said spring; a cam projection on said locking bar which, when said bar is moved into said notch, moves said spring to release said roller element to gravitate in said notch toward said bar; whereby, when said bar is moved out of said notch said roller element gravitates into alinement therewith and prevents the return of said bar into said notch, until said roller element is again displaced by turning movement of said shaft and cam.

5. The combination with a rotary shaft; of a cam on said shaft and having a notch in its perimeter; a locking bar, alternately movable into and out of said cam notch; a roller element mounted to roll in said notch, into the path of movement of said locking bar to lock said bar out of said notch; means for retaining said roller element in said notch; means adapted to detain said roller element out of alinement with said locking bar, when said shaft and cam are turned to displace said roller element from such alinement; a cam projection on said locking bar which, when said bar is moved into said notch, releases said roller element to gravitate in said notch toward said bar; whereby, when said bar is moved out of said notch said roller element gravitates into alinement therewith and prevents the return of said bar into said notch, until said roller element is again displaced by turning movement of said shaft and cam.

6. The combination with a rotary shaft; of a cam on said shaft and having a notch in its perimeter; a locking bar, alternately movable into and out of said cam notch; a roller element mounted to roll in said notch, into the path of movement of said locking bar to lock said bar out of said notch; means adapted to detain said roller element out of alinement with said locking bar, when said shaft and cam are turned to displace said roller element from such alinement; a cam projection on said locking bar which, when said bar is moved into said notch, releases said roller element to gravitate in said notch toward said bar; whereby, when said bar is moved out of said notch said roller element gravitates into alinement therewith and prevents the return of said bar into said notch, until said roller element is again displaced by turning movement of said shaft and cam.

7. A structure as in claim 4, wherein the cam is spool shaped, with a circumferential groove in its perimeter, to receive the end of the spring which cooperates with the ball.

ERIC H. BRADLEY.